(12) United States Patent
Yang et al.

(10) Patent No.: US 8,530,591 B2
(45) Date of Patent: Sep. 10, 2013

(54) EMULSION POLYMERS HAVING INCREASED CHALKY SUBSTRATE ADHESION

(75) Inventors: Yong Yang, Piscataway, NJ (US);
Robert Sheerin, N. Caldwell, NJ (US);
Clarena Shavel, Budd Lake, NJ (US);
Melissa Fagan, Chester, NJ (US)

(73) Assignee: Columbia Insurance Company, Omaha, NE (US)

( * ) Notice: Subject to any disclaimer, the term of this patent is extended or adjusted under 35 U.S.C. 154(b) by 824 days.

(21) Appl. No.: 11/774,226

(22) Filed: Jul. 6, 2007

(65) Prior Publication Data
US 2007/0265391 A1    Nov. 15, 2007

Related U.S. Application Data

(63) Continuation-in-part of application No. 11/384,183, filed on Mar. 17, 2006, now abandoned.

(51) Int. Cl.
*C08F 2/00* (2006.01)
*C08F 2/38* (2006.01)
*C08F 30/08* (2006.01)
*C08F 16/36* (2006.01)
*C08F 118/02* (2006.01)

(52) U.S. Cl.
USPC ............... 526/81; 526/78; 526/80; 526/279; 526/316; 526/319

(58) Field of Classification Search
USPC ................ 524/556, 555, 588, 592; 526/78, 526/80, 81, 87, 279, 316, 319
See application file for complete search history.

(56) References Cited

U.S. PATENT DOCUMENTS

| 5,356,956 | A | * | 10/1994 | Uemae et al. ............... 523/201 |
| 5,454,864 | A | | 10/1995 | Whalen-Shaw |
| 5,461,125 | A | * | 10/1995 | Lu et al. .................... 525/293 |
| 5,869,569 | A | | 2/1999 | Arai et al. |
| 5,990,228 | A | | 11/1999 | Eichman et al. |
| 6,403,711 | B1 | | 6/2002 | Yang et al. |
| 6,541,114 | B2 | | 4/2003 | Katou et al. |
| 6,576,051 | B2 | | 6/2003 | Bardman et al. |
| 6,710,112 | B1 | * | 3/2004 | Sandor et al. ............... 524/458 |
| 7,034,074 | B2 | | 4/2006 | Bendix et al. |
| 7,048,989 | B2 | | 5/2006 | Watkins et al. |
| 2005/0107527 | A1 | * | 5/2005 | Holub et al. ............... 524/817 |
| 2005/0166797 | A1 | | 8/2005 | Li |
| 2005/0197443 | A1 | | 9/2005 | Ziser |
| 2005/0197462 | A1 | | 9/2005 | Wang et al. |
| 2006/0029811 | A1 | | 2/2006 | Sugioka et al. |
| 2006/0148986 | A1 | | 7/2006 | Glasgow et al. |
| 2006/0191442 | A1 | | 8/2006 | He et al. |

FOREIGN PATENT DOCUMENTS

JP    2001089536 A  *  4/2001

OTHER PUBLICATIONS

English Abstrac of JP 2001-089536 A; Ito; Apr. 2001.*

* cited by examiner

*Primary Examiner* — Karuna P Reddy
(74) *Attorney, Agent, or Firm* — The H.T. Than Law Group

(57) ABSTRACT

The present invention relates to a latex composition containing polymer particles that are polymerized in at least two stages including a first phase polymer having a relatively high molecular weight and a relatively high glass transition temperature, and a second phase polymer having a relatively low molecular weight, a relatively high glass transition temperature, and polymerized from constituent monomers that include a crosslinkable monomer. Paint compositions and architectural coatings containing the latex composition according to the invention are also described herein, as well as substrates coated therewith.

21 Claims, No Drawings

EMULSION POLYMERS HAVING INCREASED CHALKY SUBSTRATE ADHESION

CROSS REFERENCE TO RELATED APPLICATION

This application is a continuation-in-part of U.S. patent application Ser. No. 11/384,183, filed Mar. 17, 2006, which is incorporated herein by reference in its entirety.

FIELD OF THE INVENTION

The present invention relates to a latex composition containing polymer particles that are polymerized in at least two stages including a first phase polymer having a relatively high molecular weight and a relatively high glass transition temperature, and a second phase polymer having a relatively low molecular weight, a relatively low glass transition temperature, and polymerized from constituent monomers that include a monomer that is crosslinkable at ambient conditions. The emulsion coating composition according to the invention can advantageously be used in paint compositions and architectural coating applications.

BACKGROUND OF THE INVENTION

Good adhesion properties, particularly to chalky substrates, are important to coatings such as paints and architectural coatings. One conventional method for improving the chalk adhesion properties of a coating composition is to add an alkyd resin to the conventional coating composition. However, alkyd resins produce premature yellowing, rendering the coatings undesirable in certain circumstances.

Another method for improving the chalk adhesion properties is to synthesize a polymer blend in a sequential polymerization. Examples of acrylic-based polymer blends made by sequential polymerization processes can be found in U.S. Pat. Nos. 5,990,228 and 6,710,112 B1.

The '228 patent discloses aqueous coating compositions containing at least two polymer components which supposedly provide adhesion and improved durability, as measured in dried coatings made from the aqueous compositions by improved gloss retention or dirt pickup resistance. Specifically, in Comparative Example 1 of the '228 patent, this patent discloses the use of a pre-polymerized latex core of 60 nm particulate poly(butyl acrylate-co-methyl methacrylate-co-methacrylic acid), upon which was further polymerized two layers of poly(butyl acrylate-co-methyl methacrylate-co-acrylic acid) of the same composition. The at least two polymer components are synthesized as core-shell polymers by a sequential polymerization process.

The '112 patent discloses aqueous polymer dispersions having two polymer phases that have different glass transition temperatures but that are formed by a sequential polymerization process. In addition, the molecular weights of the two polymer phases are different, due to the addition at some point during the sequential polymerization of a chain transfer reagent.

Other publications disclose alternatives to alkyd resin modification in coating compositions.

For example, U.S. Patent Application Publication No. 2004/0161542 A1 and U.S. Pat. No. 6,630,533 both disclose compositions containing at least one fatty acid ester. In the '542 publication, the fatty acid ester is unsaturated. In the '533 patent, the fatty acid ester comprises a $C_{12}$ to $C_{40}$ alkyl (meth)acrylate.

U.S. Pat. No. 5,376,704 discloses aqueous coating compositions containing a neutralized half-ester product of an acrylic polymer containing at least two reactive anhydride groups that is crosslinked with an epoxy crosslinker. The molecular weights of both these components are less than 100,000 Daltons.

U.S. Patent Application Publication No. 2004/0010091 A1 discloses two component coating compositions that cure under ambient conditions. The coating composition of the '091 publication contains crosslinkable and crosslinking components, with both components having molecular weights under 100,000 Daltons.

U.S. Patent Application Publication No. 2004/0010071 A1 discloses an aqueous polymer blend composition containing soft and hard polymer particles. The hard polymer particles have a glass transition temperature greater than 25° C., while the soft polymer particles have a glass transition temperature less than or equal to 25° C. In addition, the hard polymer particles constitute from 2-30 wt % of the composition, while the soft polymer particles constitute from 70-98 wt % of the composition.

U.S. Patent Application Publication No. 2005/0009954 A1 discloses aqueous polymer compositions containing hard polymers and soft polymers, with at least the hard polymers include phosphorus-containing and/or polyacid-containing pendant groups. The hard polymers have a glass transition temperature of at least 20° C., while the soft polymers have a glass transition temperature of from −20° C. to 5° C. In addition, the hard polymers constitute from 2-40 wt % of the composition, while the soft polymer particles constitute from 60-98 wt % of the composition.

There remains a need for other varied alternatives to alkyd resins for improving adhesion.

BRIEF SUMMARY OF THE INVENTION

The present invention concerns a latex composition comprising sequentially polymerized polymer particles formed in at least two polymerization stages so as to form a first phase polymer, which results from a first polymerization stage, and a second phase polymer, which results from a second polymerization stage. The first phase polymer is made from a first set of constituent monomers, has a number average molecular weight greater than about 100,000 Daltons, has a glass transition temperature at least about 10° C. higher than the glass transition temperature of the second phase polymer, and optionally comprises at least one crosslinkable monomer. The second phase polymer is made from a second set of constituent monomers, has a number average molecular weight less than about 100,000 Daltons, has a glass transition temperature below about 10° C., and comprises at least one crosslinkable monomer, and wherein the second phase polymer comprises between about 30% to about 50% of the total weight of the polymer.

DETAILED DESCRIPTION OF THE INVENTION

One aspect of the present invention relates to a latex containing polymer particles that are polymerized in at least two stages so as to form two distinct phases. The first phase is typically a bulk or core, which is the result of a first latex polymerization stage. The second phase is a surface or shell, which is the result of a second latex polymerization stage. In one embodiment, the first phase polymer has a relatively high molecular weight and a relatively high glass transition temperature, and the second phase polymer has a relatively low molecular weight, a relatively low glass transition temperature, and is polymerized from constituent monomers that include one or more crosslinkable monomers, or vice versa. In alternate embodiments, the first phase polymer can be polymerized from constituent monomers that include one or more crosslinkable monomers, including oxidatively crosslinkable monomers. As the first phase and the second phase are formed sequentially, the first and second phases of the polymer particles can be internal and external, respectively, forming a core-shell morphology, or alternately neighboring/connected to each other. As used herein, crosslinkable monomers are monomers that crosslink at ambient conditions, for example these monomers can crosslink after the paint is applied to a substrate, but not while the paint is in an aqueous solution.

As used herein, the phrases "relatively low molecular weight" and "low molecular weight" mean a number average molecular weight of less than about 100,000 Daltons. Also as used herein, the phrase "relatively high molecular weight" and "high molecular weight" mean a number average molecular weight of greater than about 100,000 Daltons, preferably greater than about 200,000 Daltons.

One of the benefits of a relatively low molecular weight polymer phase is improved substrate adhesion, and one of the benefits of relatively high molecular weight polymer phase is increased physical/mechanical strength. Combining these benefits by creating a latex composition having both relatively high molecular weight and relatively low molecular weight polymer phases is therefore desirable.

When conventional paint compositions containing relatively high molecular weight acrylic-based latexes are applied to chalky substrates, for example, they can tend to exhibit poor adhesion to the chalky surface. In some cases, as discussed above, alkyd resins are combined with these poorly-adhering acrylic-based latex-containing paint compositions to improve the wet and/or dry adhesion properties. Alkyd resins, however, may negatively affect certain qualities of the paint compositions, including, but not limited to, causing loss of gloss, causing yellowing, causing color fading, causing chalkiness, causing brittleness, hindering clean-up, decreasing emulsion stability (thus increasing the need for added surfactant), increasing sensitivity to water, and the like, and combinations thereof.

One method for improving adhesion of paint compositions applied on chalky substrates and for reducing or eliminating the need for incorporating alkyd resins with relatively high molecular weight acrylic-based latexes includes the formation of polymers containing multimodal molecular weight distributions. Multimodal molecular weight distributions in polymer particles are typically attained by sequentially polymerizing monomers and by using a molecular weight control agent, such as a chain transfer agent, at some point during the polymerization process. See, e.g., commonly-owned, co-pending U.S. patent application Ser. No. 11/323,621, filed Dec. 30, 2005, and entitled "Emulsion Polymers Having Multimodal Molecular Weight Distributions," which is incorporated herein by reference in its entirety. Such sequential polymerization processes have been described as forming core-shell type polymers, such as those disclosed, for example, in commonly-owned, co-pending U.S. patent application Ser. No. 11/290,667, filed Nov. 30, 2005, and entitled "Polymer with Improved Shelf Stability," which is incorporated herein by reference in its entirety.

It is believed that the use of polymer latex compositions containing both low molecular weight chains and high molecular weight chains in paint compositions applied on chalky substrates can advantageously reduce or eliminate the need for incorporating alkyd resins with high molecular weight latex polymers. Without being bound by any particular theory, it is believed that the presence of the second phase polymer having a lower molecular weight can sufficiently improve the adhesion of paint compositions containing them to chalky substrates. Nevertheless, because uniformly lower molecular weight polymer particles can tend to compromise the physical and mechanical properties of the paint compositions and/or the surfaces of the chalky substrates coated therewith, it is also believed that a combination of low and high molecular weight polymers can simultaneously result in acceptable adhesion and acceptable physical/mechanical properties. Latex blends having both low molecular weight chains and high molecular weight chains having good adhesion to chalky surfaces are disclosed in commonly owned, co-pending parent U.S. patent application Ser. No. 11/384,183, filed on Mar. 17, 2006, and entitled "Emulsion Polymer Blend Coating Compositions and Methods for Increasing Chalky Substrate Adhesion," which is incorporated herein by reference in its entirety. In contrast, the latex composition of the present invention is formed from a low molecular weight portion being sequentially polymerized with a high molecular weight portion.

In one embodiment, the number average molecular weight of the first phase polymer is greater than about 100,000 Daltons and the number average molecular weight of the second phase polymer is less than about 100,000 Daltons. For example, for the first phase polymer the number average molecular weight can be from about 100,000 Daltons to about 1,500,000 Daltons, preferably from about 200,000 Daltons to about 1,000,000 Daltons. The number average molecular weight of the second polymer can be from about 7,000 Daltons to about 80,000 Daltons, preferably from about 15,000 Daltons to about 60,000 Daltons.

In a preferred embodiment, the $T_g$ values of the low molecular weight monomers are below about 10° C., preferably below about 5° C., more preferably below about 0° C., and the $T_g$ of the high molecular weight monomers is at least 10° C. greater than the lower molecular weight monomers, preferably between 10° C. to 30° C. In another preferred embodiment, the resulting latex composition can be used in paint compositions having a volatile organic compound content of less than about 50 g/L.

The $T_g$ values for both the low molecular weight monomers and high molecular weight monomers can be calculated by applying Fox's law to known $T_g$ values, e.g., from any edition of the Polymer Handbook such as the $3^{rd}$ ed. (1989), of the homopolymers corresponding to each of the monomers used and their respective weight ratios. For descriptions of this method, see, e.g., U.S. Pat. No. 6,723,779 and/or International Publication No. WO 94/04581, the disclosures of both of which are incorporated herein by reference in their entireties. Alternatively, $T_g$ values can be measured using the differential scanning calorimetry technique, or other known techniques. Furthermore, as used herein when a difference in transition temperatures is reported, this difference can be expressed equivalently as being calculated by Fox's equation or measured by differential scanning calorimetry, or by other known techniques, since a temperature difference is a subtraction between two measurements and any offset in the temperature measurement is necessarily eliminated.

The weight percentage of the lower $T_g$ and lower molecular weight monomers is preferably about 30% to about 50% of the total weight of the polymer.

In the latex polymer particles of the present invention, the first phase and second phase polymers can be made from a mixture of constituent monomers containing (a) diluent monomers having either no functional groups or functional groups that are relatively unreactive and (b) functional (also called crosslinkable) monomers having functional groups that are relatively reactive and that are capable of crosslinking the polymer with a crosslinking agent. The functional monomers can be useful for later coalescence, and optionally crosslinking, if desired, of either or both of the first phase and second phase polymers. As a common functional group is a carboxylic acid group, the content of the functional monomers that are not also crosslinkable herein can be described as acid monomer content.

In one embodiment, the low molecular weight phase polymer can have a crosslinkable monomer content from about 0.1% to about 5% by weight, preferably from about 0.2% to about 4% by weight, for example from about 0.4% to about 3% by weight, from about 0.2% to about 1.5% by weight, from about 0.5% to about 4% by weight, or from about 0.5% to about 2% by weight. Similarly, in an alternate embodiment, the high molecular weight phase polymer can have a crosslinkable or oxidatively crosslinkable monomer content from about 0.1% to about 5% by weight and similar preferred sub-ranges. An example of crosslinkable monomers includes alkoxy silanes. Other suitable crosslinkable monomers are disclosed below.

In one embodiment, both the low molecular weight phase polymer and the high molecular weight phase polymer can have an average acid monomer content of less than about 10% by weight, preferably less than about 7%, more preferably from about 0.1% to about 5%, for example from about 0.5% to about 3%. Although the acid content is described herein in terms of weight percent of acid monomer, acid content can be quantified in many ways, e.g., acid number.

Many different functional groups may be suitable as pendant groups on the constituent monomers forming the polymers according to the invention. Although the polymers according to the invention can be described in terms of their acid content, it should be understood that the term "acid content" should include not merely the content of carboxylic acid-containing monomers, but the combined content of any functional/crosslinkable (but not crosslinking) monomers. Further, as used herein, the terms "polymer" and "polymers" are used to refer to oligomers, homopolymers, random copolymers, statistical copolymers, alternating copolymers, periodic copolymer, bipolymers, terpolymers, quaterpolymers, other forms of copolymers, adducts thereof, substituted derivatives thereof, and combinations or blends thereof. Such polymers can be linear, branched, hyper-branched, crosslinked, block, di-block, multi-block, graft, isotactic, syndiotactic, stereoregular, atactic, gradient, multi-arm star, comb, dendritic, and/or any combination thereof.

Examples of polymer repeat units having functional groups can include, but are not limited to, acrylic acid, ionic acrylate salts, alkacrylic acids, ionic alkacrylate salts, haloacrylic acids, ionic haloacrylate salts, acetoacetoxyalkyl acrylates, acetoacetoxyalkyl alkacrylates, polymerizable anhydrides such as maleic anhydride, acrylamide, alkacrylamides, monoalkyl acrylamides, monoalkyl alkacrylamides, wet adhesion monomers such as alkacrylamidoalkyl ethyleneureas and alkenyloxyamidoalkyl ethyleneureas, sold under the trade names Sipomer™ WAM (II), Sipomer™ WAM (IV), MONOMER QM-1458, and Cylink™ C4, and Rohamere®, vinyl dicarboxylic organic acids (e.g., itaconic acid, glutaconic acid, maleic acid, angelic acid, fumaric acid, tiglic acid, and the like), monoalkyl esters of vinyl dicarboxylic organic acids (e.g., methyl maleate, ethyl fumarate, and the like), monoisopropenyl esters of saturated, vinyl dicarboxylic organic acids, monoalkoxydialkyl vinyl silanes, dialkoxyalkyl vinyl silanes, trialkoxy vinyl silanes, monoalkoxy acrylic silanes, dialkoxy acrylic silanes, trialkoxy acrylic silanes, trialkoxy methacrylic silanes, monoalkoxy epoxy silanes, dialkoxy epoxy silanes or trialkoxy epoxy silanes, diacetone acrylamides, and the like, and copolymers and combinations thereof.

As used herein, the prefix "alk" before an ethylenically unsaturated monomer should be understood to indicate a $C_1$-$C_6$ hydrocarbon side group attached to either carbon of the olefinic pendant group, though it usually refers to a group attached to the same carbon as the olefinic pendant group. For example, the most basic alkacrylic acid is methacrylic acid. However, if the "alk" group is on the vinyl carbon not containing the pendant carboxylic acid, then a methacrylic acid becomes crotonic acid, which is contemplated as an alkacrylic acid, as defined herein. Another example includes tiglic acid (i.e., 2-butene-2-carboxylic acid), which is an alkacrylic acid containing two "alk" groups, with one methyl group attached to each vinyl carbon. As used herein, the term "alkyl" should be understood to mean an aliphatic $C_1$-$C_{18}$ hydrocarbon moiety. For instance, the monomer ethyl methacrylate has a methyl group attached as an ester to the pendant carboxylate group and an ethyl group attached to the same carbon of the vinyl moiety as the pendant carboxylate (i.e., $CH_2$=$C(CH_2CH_3)$—$C(=O)O(CH_3)$). As used herein, the term "alkenyl" should be understood to mean a $C_2$-$C_{12}$ hydrocarbon moiety having a single double bond, preferably a terminal double bond. As used herein, the term "alkoxy" group should be understood to mean a group having a $C_1$-$C_{12}$ hydrocarbon or oxyhydrocarbon (i.e., containing hydrogen, carbon, and oxygen atoms) moiety attached to a terminal oxygen atom.

In the embodiments where the polymer repeat units include ionic salts, their counterions can include, but are not limited to, sodium, potassium, lithium, copper, silver, ammonium, tetraalkyl ammonium, alkyl pyridinium ions such as N-methyl pyridinium, tetraalkyl phosphonium ions, tetraaryl phosphonium ions, aralkyl phosphonium ions such as methyltriphenylphosphonium and methyltriphenoxyphosphonium, trialkylsulfonium ions such as trimethylsulfonium, aralkyl sulfonium ions, trialkylsulfoxonium ions such as trimethylsulfoxonium, aralkyl sulfoxonium ions, and the like, and combinations thereof. As used herein, the term "aryl" should be understood to mean an aromatic $C_6$-$C_{18}$ moiety, and the term "aralkyl" should be understood to mean a moiety that is partially aryl and partially alkyl.

In one embodiment, the constituent monomers of the first phase polymer, the constituent monomers of the second phase polymer, or both, can be substantially free from hydroxy-functional pendant groups such as, but not limited to, those in hydroxyalkyl acrylates, hydroxyalkyl alkacrylates, vinyl phenols, hydroxyalkyl vinyl benzenes, only partially esterified acrylate esters of alkylene glycols, only partially esterified acrylate esters of non-polymeric polyhydroxy compounds like glycerol, only partially esterified acrylate esters of polymeric polyhydroxy compounds, and the like. In another embodiment, the constituent monomers of the first phase polymer, the constituent monomers of the second phase polymer, or both, can be substantially free from conjugated diene monomers such as, but not limited to, butadienes, hexadienes, hexatrienes, octadienes, octatrienes, octatetrenes, as well as hydrocarbon analogs thereof, substituted halo- and/or cyano-derivatives thereof, and the like, and a combination thereof. In another embodiment, the constituent monomers of the first phase polymer, the constituent monomers of the second phase polymer, or both, can be substantially free from phosphorus-containing pendant groups, from polyacid-containing pendant groups, or both.

As used herein, the terms "substantially no" and "substantially free from", referring to a component in a composition, mean that the composition comprises not more than about 1 wt %, preferably not more than about 0.5 wt %, more preferably not more than about 0.1 wt %, most preferably not more than about 0.02 wt %, or in some cases completely none (about 0%), of the component.

In addition to the monomers containing functional groups, the polymers according to the invention can also comprise diluent monomers or repeat units that contain pendant groups that do not typically react with crosslinking agents. Examples of such diluent monomers can include, but are not limited to, alkyl acrylates, alkyl alkacrylates, alkyl esters of vinyl monocarboxylic organic acids other than acrylates and alkacrylates (e.g., ethyl tiglate, methyl crotonate, and the like), dialkyl esters of vinyl dicarboxylic acids, styrene, alkylstyrenes (e.g., α-ethylstyrene, α-methylstyrene, vinyl toluene, 2,4-dimethylstyrene, 4-t-butylstyrene, and the like), halostyrenes (e.g., α-bromostyrene, 2,6-dichlorostyrene, and the like), isopropenyl esters of saturated, monocarboxylic organic acids (e.g., isopropenyl acetate, isopropenyl isobutyrate, and the like), monoisopropenyl monoalkyl esters of saturated, dicarboxylic organic acids (e.g., isopropenyl alkyl oxalate, isopropenyl alkyl succinate, and the like), vinyl carboxylate alkyl ethers (e.g., vinyl acetate, vinyl propionate, vinyl butyrates, vinyl benzoates, halo-substituted versions thereof such as vinyl chloroacetate, and the like), vinyl alkyl ethers, acrylonitrile, alkacrylonitriles, dialkyl acrylamides, dialkyl alkacrylamides, allyl compounds (e.g., allyl chloride, allyl esters of saturated, monocarboxylic acids, allyl alkyl esters of saturated, dicarboxylic organic acids, and the like), and the like, and combinations thereof. Preferred diluent monomers include, but are not limited to, $C_1$-$C_8$ alkyl acrylates, $C_1$-$C_8$ alkyl $C_1$-$C_2$ alkacrylates, styrene, $C_1$-$C_4$ alkylstyrenes, vinyl acetate, and combinations thereof.

In one embodiment, both the polymeric phases according to the invention can be substantially acrylic. As used herein, the term "acrylic" refers to (co)polymer compositions made from monomers selected from the group consisting of acrylates, alkacrylates, alkyl acrylates, alkyl alkacrylates, acrylic acid, ionic acrylate salts, alkacrylic acids, ionic alkacrylate salts, acrylamide, alkacrylamides, monoalkyl acrylamides, monoalkyl alkacrylamides, acrylonitrile, alkacrylonitriles, substituted versions thereof (e.g., hydroxyalkyl acrylates, hydroxyalkyl alkacrylates, alkacrylamidoalkyl ethyleneureas, alkenyloxyamidoalkyl ethyleneureas, and the like), and the like, and combinations thereof. As used herein, the term "substantially," at least with regard to a component in a composition, means that the composition contains at least about 90% by weight of that component, preferably at least about 95% by weight of that component, more preferably at least about 97% by weight of that component, most preferably at least about 99% by weight of that component.

It is known in the prior art to form sequentially polymerized-type acrylic latex polymers by pre-polymerizing monomers into core particles, and then manipulating, isolating, purifying, and/or separating the core particles before forming an acrylic shell around the core particles. See, e.g., U.S. Pat. No. 5,990,228, Comparative Example 1 at columns 4-5 (specifically column 4, line 43), for the use of a pre-formed core. All of the Examples in the '228 patent further disclose compositions that are polymerized in the presence of this pre-formed core. The sequentially polymerized latex polymers according to the invention also specifically exclude the use of pre-polymerized and isolated/purified polymer particles not only between stages of sequential polymerization but also prior to the first stage of sequential polymerization. However, it should be noted that this limitation does not exclude the use of "seed" particles. In fact, in one embodiment, the sequential polymerization of a latex polymer commences with the addition of a seed amount of monomer emulsion (see Examples 1-4) or with the addition of a water dispersible alkyd seed (see Example 5).

In one embodiment, as illustrated in Examples 1 and 2 below, at least the first phase polymer (i.e., having a relatively high molecular weight and a relatively high $T_g$) is substantially free from crosslinkable monomers, and the second phase polymer (i.e., having a relatively low molecular weight and a relatively low $T_g$) can contain an amount of a crosslinkable monomer such as an alkoxy silane, for example SILQUEST™ A-151, which can crosslink at ambient conditions.

In another embodiment, both phases contain a single crosslinkable monomer which can undergo crosslinking at ambient conditions. More particularly, as illustrated in Example 3 below, both the first phase polymer and the second phase polymer comprise diacetone acrylamide with adipic dihydrazide, which is an additive used as an activator. The diacetone acrylamide/adipic dihydrazide combination can crosslink at ambient conditions during and after the composition dried and formed a film/paint.

In a preferred embodiment, the first phase polymer contains at least one crosslinkable monomer and the second phase polymer contains two or more crosslinkable monomers. More particularly, as illustrated in Example 4 below, diacetone acrylamide is used as a crosslinkable monomer in the first phase polymer. Further, the second phase polymer contains diacetone acrylamide as well as an alkoxy silane, for example SILQUEST™ A-151. The diacetone acrylamide can be used in conjunction with adipic dihyrdazide. In one variation of this preferred embodiment, the second phase polymer can have three different crosslinkable monomers. In yet another variation of this preferred embodiment, the first phase polymer can have two or more crosslinkable monomers and the second phase polymer has at least one crosslinkable monomer.

In another embodiment, a water dispersible alkyd is used as seeds. The alkyd has good adhesion on chalky surface and can be oxidatively crosslinked. See Example 5 below.

In one embodiment, the latex composition according to the invention can be used in architectural coatings and in paint formulations. See Examples 6-9 below. In another embodiment, the latex composition according to the invention can be combined with one or more pigments/colorants in hydrophobic latex applications.

The polymer particles according to the invention are typically polymerized in a latex system comprising water, surfactant, the desired monomer(s), an initiator, a polymer molecular weight control agent (in the case of the low molecular weight phase polymer), optionally an organic solvent, optionally a pH adjustor, optionally a chaser agent, optionally a coalescing agent, and optionally a preservative, which can be added at various times.

Examples of surfactants useful in the compositions according to the invention can include, but are not limited to, non-ionic and/or anionic surfactants such as ammonium nonoxynol-4 sulfate, nonylphenol (~10 mol %) ethoxylate, nonylphenol (~40 mol %) ethoxylate, octylphenol (~40 mol %) ethoxylate, octylphenol (~9-10 mol %) ethoxylate, sodium dodecyl sulfonate, sodium tetradecyl sulfonate, sodium hexadecyl sulfonate, polyether phosphate esters, alcohol ethoxylate phosphate esters, those compounds sold under the trade name Triton™ (e.g., QS series, CF series, X series, and the like), those compounds sold under the trade name Igepal™, those compounds sold under the trade name Rhodapon™, those sold under the trade name Rhodapex™, those compounds sold under the trade name Rhodacal™, those compounds sold under the trade name Rhodafac™, and the like, and combinations thereof.

Examples of initiators and chaser solutions useful in the compositions according to the invention can include, but are not limited to, ammonium persulfate, sodium persulfate, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjustor, if desired to stabilize the emulsion.

Examples of pH adjustors useful in the compositions according to the invention can include, but are not limited to, ammonium hydroxide, sodium hydroxide, sodium carbonate, sodium bicarbonate, potassium hydroxide, potassium carbonate, potassium bicarbonate, ammonia, and the like, and combinations thereof. In certain cases, compounds that qualify as pH adjustors can be added for purposes other than adjusting pH, e.g., emulsion stabilization, and yet are still characterized herein as pH adjustors.

Polymer molecular weight control agents are designed to control (usually to limit) the molecular weight of a propagating polymer. While polymer molecular weight control agents can include things like radiation, they are typically molecules added to the polymerization mixture. Examples of polymer molecular weight control agents include, but are not limited to, chain transfer agents (CTAs), e.g., alkyl mercapto-esters such as isooctyl mercaptopropionate, alkyl mercaptans, and the like, and combinations thereof. Chain transfer agents typically operate as polymer molecular weight control agent molecules, for example, by catalytically or consumptively terminating a propagating polymer chain in a way that also initiates a newly propagating polymer chain. In this way, the amount of chain transfer agent(s) can be tailored to reduce the target polymer molecular weight in a set polymerization system, or alternately, in combination with calculation of the amount of initiator, can be calculated to target a particular average polymer molecular weight (e.g., within a given range) of a polymerization system. The amount of chain transfer agent is typically about 0.1-1% of the totally polymer content.

Examples of biocides/preservatives useful in the compositions according to the invention can include, but are not limited to, hydroxy-functional aza-dioxabicyclo compounds such as those commercially available from ISP under the trade name Nuosept™ 95, those compounds sold under the trade name SKANE™, isothiazolones such as those sold under the trade name Kathon™, Polyphase additives from Troy Corp. and the like, and combinations thereof.

In another aspect of the invention, the latex compositions can be included in a paint or other coating composition, which can advantageously be an emulsion further containing water, a coalescence solvent, a pH adjustor, a surfactant, a defoamer, a pigment, optionally but preferably a dispersant, optionally but preferably a rheology modifier, and optionally but preferably a biocide or preservative.

Examples of coalescence solvents and organic solvents useful in the compositions according to the invention can include, but are not limited to, 2-ethylhexyl ether of ethylene glycol (e.g., commercially available as Eastman™ EEH solvent), methyl carbitol, propylene glycol, ethylene glycol, those compounds sold under the trade name TEXANOL™, plasticizers such as dibutyl phthalate, and the like, and combinations thereof.

Examples of defoamers useful in the compositions according to the invention can include, but are not limited to, polysiloxane-polyether copolymers such as those sold by Tego under the trade name Foamex™, those sold under the trade name BYK™, those sold under the trade name Drewplus™, those sold under the trade name Surfynol™, and the like, and combinations thereof.

Examples of anticorrosive agents useful in the compositions according to the invention can include, but are not limited to, sodium nitrite, ammonium benzoate, sodium benzoate and the like.

Examples of dispersants useful in the compositions according to the invention can include, but are not limited to, 2-amino-2-methyl-1-propanol, hydrophobic copolymers such as Tamol™ 165A, carboxylated polyelectrolyte salts such as Tamol™ 731A, and the like, and combinations thereof.

Examples of rheology modifiers useful in the compositions according to the invention can include, but are not limited to, hydrophobically modified urethane rheology modifiers, hydrophobically modified polyether rheology modifiers, alkali swellable (or soluble) emulsions, hydrophobically modified alkali swellable (or soluble) emulsions, cellulosic or hydrophobically modified cellulosic rheology modifiers. Examples are those available from Rohm & Haas under the trade name Acrysol™, such as RM-8W, RM-825, RM-5000, RM-2020 NPR and RM-825, RM-5, TT-935, and Natrasol™, Natrasol Plus™ and Aquaflow™ from Aqualon Division of Hercules Inc, and UCAR Polyphobe™ from Dow.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention.

Additionally or alternately, extender pigments/colorants can be added, e.g., to the grind composition portion of the paint composition. Examples of extender pigments/colorants useful in the paint compositions according to the invention can include, but are not limited to, silica, silicates, carbonates such as calcium carbonates, and the like, and combinations thereof.

The paint compositions containing the sequentially polymerized polymer particles according to the invention can exhibit a wide range of viscosities, depending upon the application. In one embodiment, the viscosity of the sequentially polymerized latex can be from about 65 to about 130 Krebunits (KU), preferably from about 75 to about 120 KU, more preferably from about 85 to about 110 KU. While the viscosity may increase over time, it is preferable that it not increase beyond about 135 KU, preferably not beyond about 125 KU, more preferably not beyond about 120 KU, and in some cases not beyond about 115 KU.

The latex compositions according to the invention can advantageously exhibit a pH from about 6 to about 10, although the pH needs only to be sufficient to maintain the stability of the particular in combination with the surfactant(s) and other stabilizing components.

Whether in combination with a crosslinking composition, in a paint composition, or by itself, the acrylic latexes according to the invention are typically applied to a substrate. The substrate may or may not depend upon the product in which acrylic latex according to the invention is used. For example, when the acrylic latex is used in a stain composition, the substrate can typically be wood or the like. Examples of substrates can include, but are not limited to: wood, including natural wood, compressed particulate wood, faux or artificial wood, wood composites, and the like, and combinations thereof, metals, including metal alloys, metal composites, coated metals, metallic surfaces, and the like, and combinations thereof, ceramics, including metal oxides, metal nitrides, metal oxynitrides, metal sulfides, metal carbides, and the like, and combinations thereof, transparent and/or translucent substrates such as glasses, polycarbonates, acrylics, styrenics, and the like, and combinations thereof, polymers; woven and/or non-woven fabrics; chalky substrates; building materials such as sheet rock; and the like; and combinations thereof.

A conventional acrylic latex polymerization typically involves a single charge of monomer or a monomer mix that is introduced/emulsified, initiated, and polymerized to form polymer particles. However, a two-stage sequential latex polymerization according to the invention can involve the following: a first introduction, initiation, and polymerization of a first charge of monomer to form the first phase; and, immediately thereafter, a second introduction of a second charge of monomer or a monomer mix and co-polymerization of that second charge of monomer with the first phase to form a second phase. Multi-stage sequential latex polymerizations according to the invention specifically exclude actively manipulating, isolating, purifying, and/or separating the first phase in/from the latex in between the first polymerization of the monomers that form the first phase and the second introduction of the monomers that form the second phase.

A multi-stage sequential latex polymerization according to the invention can occur in the following manner. First, an initial kettle charge containing water, optionally but preferably a surfactant, and optionally an organic solvent is placed in a reaction vessel and brought to a polymerization temperature with nitrogen purge. The polymerization temperature can be tailored to the particular initiators/monomers in the polymerization. For example, when ammonium persulfate is used as the initiator for acrylic and styrene monomers, the polymerization temperature can be between about 70° C. and about 90° C., preferably between about 75° C. and about 85° C., for example about 80° C. When the initial kettle charge and the reaction vessel are at temperature, a seed amount of a first emulsion containing water, a surfactant, a functional monomer, a diluent monomer, and optionally a pH adjustor can then be added. A first solution containing water and initiator can thereafter be added to the emulsion. A seed amount of monomer, in combination with the initiator solution, should be sufficient to allow the polymerization to begin. In one embodiment, the seed amount can represent about 1% to about 10%, for example from about 3% to about 6%, of the weight of the first emulsion. When the sequential polymerization includes only two stages, the proportion of monomers added in this first emulsion can advantageously represent the desired composition of the first phase.

Typically, a short period of time such as about 15 minutes, is allowed for the initiator solution and the monomer emulsion to reach the polymerization temperature and for the polymerization to begin. Thereafter, the remainder of the first emulsion can be added to the reaction vessel, either continuously or in multiple sequential charges, along with a second solution containing water and initiator. The first emulsion can advantageously contain at least about 25 wt %, preferably at least about 45 wt %, more preferably at least about 60 wt %, for example at least about 75 wt % of the total monomer content. The first emulsion can also advantageously contain no more than about 90 wt %, preferably no more than about 85 wt %, more preferably no more than about 80 wt % of the total monomer content.

When all of the first emulsion has been added, immediately thereafter a second emulsion is co-added with the second solution. The second emulsion contains water, a surfactant, a functional monomer, a diluent monomer, and optionally a pH adjustor. The rates of addition of the first and second emulsions and the second solution can advantageously be tailored to be appropriate to the reaction conditions and the nature of the reactants in the polymerization. Nevertheless, the rate of addition of the second initiator solution should typically be such that the second solution is co-added during both the addition of the remainder of the first emulsion and the addition of the second emulsion.

If the sequential polymerization comprises more than two stages, and thus includes adding more than two distinct monomer emulsions, the intervening monomer emulsions and the intervening initiator solutions can be co-added after the completion of adding the remainder of the first emulsion and before the co-addition of the second monomer emulsion and the second initiator solution. When the sequential polymerization comprises more than two stages, there may be a single intervening stage (three-stage polymerization), two intervening stages (four-stage polymerization), or more than two intervening stages.

In one embodiment, the sequential addition of the monomer emulsions can occur for a period of about 2 to about 5 hours, preferably from about 3 to about 4 hours, for example about 210 minutes. After the additions of monomer and initiator have ended, a sufficient polymerization time is allowed. This polymerization time can be, in one embodiment, from about ½ hour to about 2 hours, for example about 1 hour. When the sequential polymerization includes only two stages, the proportion of monomers added in the second emulsion can advantageously represent the desired composition of the second phase.

After the polymerization has run its course, the contents of the reaction vessel can advantageously be rinsed with water. Also optionally but preferably, a chaser solution containing water, a redox initiator system comprising an oxidizing agent and a reducing agent, and optionally a surfactant can be added to the reaction vessel. The primary purpose of the chaser solution, when present, is to react with, and thus devolatilize, any residual monomers and/or low molecular weight oligomers from the polymerization. Following the optional addition of the chaser solution, a stabilizing solution containing water and a pH adjustor and/or a biocide/preservative can optionally be added to the reaction vessel to help stabilize the latex emulsion. A coalescence solvent may optionally be added at a later stage.

If more than a second stage of sequential polymerization is undertaken according to the aforementioned multi-stage sequential latex polymerization method, each of the monomer emulsions from the second stage to the last stage should immediately and sequentially follow the addition of the remainder of the first monomer emulsion and should also be co-added with the second initiator solution. As used herein, the term "immediately," at least in relation to the occurrence of two actions in a chemical process, should be understood to mean that the two actions occur temporally within seconds of each other or within a reasonably small amount of time, and without any intervening actions, so as to have little or no effect on the outcome of the chemical process.

Also, similarly to the second monomer emulsion, each additional monomer emulsion should contain water, a surfactant, a functional monomer, a diluent monomer, and optionally a pH adjustor. Further, when the sequential polymerization includes more than two stages, the proportion of monomers added in the last stage emulsion can advantageously represent the desired composition of the second phase. In addition, if the relative contents of the various monomers change constantly and/or if there are a large number of stages having different relative monomer contents, the multi-stage polymerization can be considered a gradient polymerization.

In one embodiment, a paint composition containing sequentially polymerized latex particles according to the invention can be formulated according to the following method. First, a pigment dispersion composition, or grind, is formed by: combining an organic solvent, water, a dispersant, a pH adjustor, a surfactant, a defoamer, a colorant/pigment, and a biocide/preservative; stirring and optionally grinding for a period of time to sufficiently mix the ingredients; and, while continuing to stir and/or grind, adding more water. To this pigment dispersion composition can be added a latex containing sequentially polymerized polymer particle according to the invention, followed by a pH adjustor, if desired, and a performance additive composition comprising an organic solvent, a surfactant, and a defoamer. Optionally but preferably, an anticorrosive solution can then be added. Then, a rheology modifier can be added, optionally including more water, if desired, and also a pH adjustor, thus forming a paint composition. Furthermore, if desired, more colorant(s) and/or pigment(s) can be added to the paint composition either to compliment the (white) pigment(s)/colorant(s) already in the pigment dispersion composition or to add another desired color to the paint composition. A coalescence solvent may optionally be added later.

EXAMPLES

The following Examples are merely illustrative of certain embodiments of the invention and contain comparisons of compositions and methods according to the invention with the prior art and/or embodiments not according to the invention. The following Examples are not meant to limit the scope and breadth of the present invention, as recited in the appended claims.

Example 1

Two-Stage Feed Latex Polymer

Example 1 describes a two-stage feed latex polymer. The first stage has a higher $T_g$ and high molecular weight polymer composition. The second stage has a lower $T_g$ and lower molecular weight polymer composition. The first stage feed polymer has a $T_g$ around 14.2° C. and a molecular weight over 500,000 Daltons. The second stage polymer has a $T_g$ around −5° C. and has a molecular weight of about 29,000 Daltons.

The glass transition temperature of the copolymers was calculated by applying Fox's law to known $T_g$ values e.g., from any edition of the Polymer Handbook such as the $3^{rd}$ ed. (1989), of the homopolymers corresponding to each of the monomers used and their respective weight ratios.

The molecular weight value for the polymer of Example 1 was obtained by analyzing the acrylic latex polymer particles using a GPC method using WATERS 410 with differential Refractomer and tetrahydrofuran as mobile phase at 40° C.

The polymer formulation, in order of addition, is described below in Table 1 along with the procedure therefor.

TABLE 1

| Ingredients | Amount (grams) | Monomer % per stage | Procedure |
|---|---|---|---|
| Initial Kettle Charge | | | |
| deionized water | 845 | | Add deionized water and |
| RHODACAL ™ DS-4 surfactant | 1 | | RHODACAL ™ DS-4 to reactor, heat reactor to 80° C. with nitrogen purge. |
| First Monomer Emulsion | | | Add 50 grams of first monomer |
| deionized water | 95 | | emulsion and all first initiator |
| RHODACAL ™ DS-4 surfactant | 20 | | solution and wait for 15 minutes. Start feed first monomer emulsion |
| RHODAPEX ™ C0-436 surfactant | 5 | | over 1 and ½ hours and start $2^{nd}$ initiator solution over 3 and ½ hours. |
| Rohm & Haas Wet Adhesion Monomer QM1458 (50% active) | 12.5 | 1.1 wt % | Start feed $2^{nd}$ monomer emulsion after $1^{st}$ monomer emulsion is fed, over a period of 2 hours. |
| methacrylic acid monomer | 6 | 1.0 wt % | Rinse monomer feeding pipes. |
| methyl methacrylate monomer | 300 | 54.8 wt % | After all monomer emulsion is fed, |
| 2-ethylhexyl acrylate monomer | 235 | 42.9 wt % | maintain temperature at 80° C. for one hour. |
| First Initiator Solution | | | Cool reactor to 65° C. |
| deionized water | 20 | | |
| ammonium persulfate | 2.5 | | |

TABLE 1-continued

| Ingredients | Amount (grams) | Monomer % per stage | Procedure |
|---|---|---|---|
| Second Monomer Emulsion | | | |
| deionized water | 95 | | |
| RHODACAL ™ DS-4 surfactant | 20 | | |
| RHODAPEX ™ CO-436 surfactant | 5 | | |
| Rohm & Haas Wet Adhesion Monomer QM1458 (50% active) | 12.5 | 1.1 wt % | |
| methacrylic acid monomer | 6 | 1.1 wt % | |
| methyl methacrylate monomer | 230 | 41.0 wt % | |
| 2-ethylhexyl acrylate monomer | 305 | 54.2 wt % | |
| isooctyl 2-mercaptopropionate CTA | 5 | | |
| SILQUEST ™ A-151 | 10 | 1.8 wt % | |
| Second Initiator Solution | | | |
| deionized water | 40 | | |
| ammonium persulfate | 2.5 | | |
| deionized water (rinse) | 10 | | |
| Chaser Solutions | | | Feed t-butyl hydroperoxide and sodium hydroxymethanesulfinate solution over 30 minutes. |
| t-butyl hydroperoxide | 1.4 | | |
| deionized water | 10 | | |
| sodium hydroxymethanesulfinate | 1 | | |
| deionized water | 15 | | |
| pH Adjustor | | | Cool reactor to 35° C. and add ammonium hydroxide solution. |
| ammonium hydroxide (38%) | 10 | | |
| deionized water | 10 | | |

Example 2

Two-Stage Feed Latex Polymer

Example 2 describes a two-stage feed latex polymer. The first stage polymer has $T_g$ of 10° C. and the second stage polymer has $T_g$ of −1° C. The first stage polymer has a molecular weight over 500,000 Daltons. Because less chain transfer agent was used than in Example 1, the second stage polymer has a molecular weight about 43,000 Daltons.

The polymer was prepared in the same way as in Example 1. The polymer formulation, in order of addition, is described below in Table 2.

TABLE 2

| Ingredients | Amount (grams) | Monomer % per stage |
|---|---|---|
| Initial Kettle Charge | | |
| deionized water | 845 | |
| RHODACAL ™ DS-4 surfactant | 1 | |
| First Monomer Emulsion | | |
| deionized water | 95 | |
| RHODACAL ™ DS-4 surfactant | 20 | |
| RHODAPEX ™ CO-436 surfactant | 5 | |
| Rohm & Haas Wet Adhesion Monomer QM1458 (50% active) | 12.5 | 1.1 wt % |
| methacrylic acid monomer | 6 | 1.0 wt % |
| methyl methacrylate monomer | 300 | 54.8 wt % |
| 2-ethylhexyl acrylate monomer | 235 | 42.9 wt % |
| First Initiator Solution | | |
| deionized water | 20 | |
| ammonium persulfate | 2.5 | |
| Second Monomer Emulsion | | |
| deionized water | 95 | |
| RHODACAL ™ DS-4 surfactant | 20 | |
| RHODAPEX ™ CO-436 surfactant | 5 | |
| Rohm & Haas Wet Adhesion Monomer QM1458 (50% active) | 12.5 | 1.1 wt % |
| hydroxylethylemethacrylate | 10 | 1.8 wt % |
| methacrylic acid monomer | 6 | 1.0 wt % |
| methyl methacrylate monomer | 230 | 40.5 wt % |
| 2-ethylhexyl acrylate monomer | 305 | 53.8 wt % |
| isooctyl 2-mercaptopropionate CTA | 3 | |
| SILQUEST ™ A-151 (vinyltriethoxysilane monomer) | 10 | 1.8 wt % |
| Second Initiator Solution | | |
| deionized water | 40 | |
| ammonium persulfate | 2.5 | |
| deionized water (rinse) | 10 | |
| Chaser Solutions | | |
| t-butyl hydroperoxide | 1.4 | |
| deionized water | 10 | |
| sodium hydroxymethanesulfinate | 1 | |
| deionized water | 15 | |
| pH Adjustor | | |
| ammonium hydroxide (38%) | 10 | |
| deionized water | 10 | |

Example 3

Two-Stage Polymer Using Diacetone Acrylamide Crosslinker/Adipic Dihydrazide

Example 3 describes a 2-stage polymer using diacetone acrylamide/adipic dihydrazide as crosslinkable monomer/activator. In the first stage, a high molecular weight polymer was prepared with a $T_g$ of 13° C. (calculated). Once about 60% of first stage monomer emulsion was fed, additional 2ethylhexylacrylate monomer and a chain transfer agent were added to the remaining monomer emulsion as a second stage feed. The $T_g$ of this second stage polymer is −3.4° C. as calculated by Fox's Law. The polymer formulation, in order of addition, is described below in Table 3 along with the procedure therefor.

TABLE 3

| Ingredients | Amount (grams) | Monomer % per stage | Procedure |
|---|---|---|---|
| Initial Kettle Charge | | | Add deionized water, |
| deionized water | 830 | | sodium bicarbonate and |
| IGEPAL ™ CO-710 | 1 | | IGEPAL ™ CO-710 to |
| Sodium bicarbonate | 1 | | reactor, heat reactor to 80° C. with nitrogen purge. |
| Monomer Emulsion | | | Add 50 grams of first |
| deionized water | 190 | | monomer emulsion and |
| RHODACAL ™ DS-4 surfactant | 40 | | all first initiator solution, wait for 15 minutes. |
| RHODAPEX ™ C0-436 surfactant | 5 | | Start feed first monomer emulsion over 1 and ½ |
| Diacetone acrylamide | 40 | | hours and start $2^{nd}$ |
| Rohm & Haas Wet Adhesion Monomer QM1458 (50% active) | 23 | | initiator solution over 3 and ½ hours. When 60% (757 grams) |
| methacrylic acid monomer | 9 | | of the first monomer emulsion is fed, add $2^{nd}$ |
| methyl methacrylate monomer | 528 | | monomer and additives to the remaining |
| 2-ethylhexyl acrylate monomer | 425 | | monomer and continue feeding monomer to |
| First Initiator Solution | | | reactor. |
| deionized water | 20 | | Rinse monomer feeding |
| ammonium persulfate | 2.5 | | pipes. |
| Second Monomer and Additives | | | After all monomer emulsion is fed, maintain |
| 2-ethylhexyl acrylate monomer | 93 | | temperature at 80° C. for one hour. |
| isooctyl 2-mercaptopropionate CTA | 3 | | Cool reactor to 65° C. |
| Second Initiator Solution | | | |
| deionized water | 40 | | |
| ammonium persulfate | 2.5 | | |
| deionized water (rinse) | 10 | | |
| Chaser Solutions | | | Feed t-butyl |
| t-butyl hydroperoxide | 1.4 | | hydroperoxide and |
| deionized water | 10 | | sodium hydroxymethanesulfinate |
| sodium hydroxymethanesulfinate | 1 | | solution over 30 minutes. |
| deionized water | 15 | | |
| Additive | | | Cool reactor to 35° C. and |
| deionized water | 15 | | add adipic dihydrazide |
| Adipic Dihydrazide | 9 | | solution. |
| pH Adjustor | | | Add ammonium |
| ammonium hydroxide (38%) | 10 | | hydroxide solution. |
| deionized water | 10 | | |

Example 4

Two-Stage Polymer Using Diacetone Acrylamide Crosslinker/Adipic Dihydrazide and Alkoxy Silane Monomer as Crosslinkers Example 4 describes a two-stage polymer using diacetone acrylamide/adipic dihydrazide and alkoxy silane monomers as crosslinkable monomers. The polymer formulation, in order of addition, is described below in Table 4 along with the procedure therefor.

TABLE 4

| Ingredients | Amount (grams) | Monomer % per stage | Procedure |
|---|---|---|---|
| Initial Kettle Charge | | | Add deionized water, sodium bicarbonate and IGEPAL ™ CO-710 to reactor, heat reactor to 80° C. with nitrogen purge. |
| deionized water | 830 | | |
| IGEPAL ™ CO-710 | 1 | | |
| Sodium bicarbonate | 1 | | |
| Monomer Emulsion | | | Add 50 grams of first monomer emulsion and all first initiator solution, wait for 15 minutes. Start feed first monomer emulsion over 1 and ½ hours and start $2^{nd}$ initiator solution over 3 and ½ hours. When 60% (757 grams) of the first monomer emulsion is fed, add $2^{nd}$ monomer and additives to the remaining monomer and continue feeding monomer to reactor. Rinse monomer feeding pipes. After all monomer emulsion is fed, maintain temperature at 80° C. for one hour. Cool reactor to 65° C. |
| deionized water | 190 | | |
| RHODACAL ™ DS-4 surfactant | 40 | | |
| RHODAPEX ™ C0-436 surfactant | 5 | | |
| Diacetone acrylamide | 40 | | |
| Rohm & Haas Wet Adhesion Monomer QM1458 (50% active) | 23 | | |
| methacrylic acid monomer | 9 | | |
| methyl methacrylate monomer | 528 | | |
| 2-ethylhexyl acrylate monomer | 425 | | |
| First Initiator Solution | | | |
| deionized water | 20 | | |
| ammonium persulfate | 2.5 | | |
| Second Monomer and Additives | | | |
| 2-ethylhexyl acrylate monomer | 93 | | |
| isooctyl 2-mercaptopropionate CTA | 3 | | |
| SILQUEST ™ A-151 (vinyltriethoxysilane monomer) | 5 | | |
| Second Initiator Solution | | | |
| deionized water | 40 | | |
| ammonium persulfate | 2.5 | | |
| deionized water (rinse) | 10 | | |
| Chaser Solutions | | | Feed t-butyl hydroperoxide and sodium hydroxymethanesulfinate solution over 30 minutes |
| t-butyl hydroperoxide | 1.4 | | |
| deionized water | 10 | | |
| sodium hydroxymethanesulfinate | 1 | | |
| deionized water | 15 | | |
| Additive | | | Cool reactor to 35° C. and add adipic dihydrazide solution. |
| deionized water | 15 | | |
| Adipic Dihydrazide | 9 | | |
| pH Adjustor | | | Add ammonium hydroxide solution. |
| ammonium hydroxide (38%) | 10 | | |
| deionized water | 10 | | |

Example 5

Two-Stage Latex Polymer with Water Dispersible Alkyd as Seed

Example 5 describes a two-stage polymer using water dispersible alkyd as seed. The polymer from the first stage has a $T_g$ of 16° C. (calculated) and from the second stage has a $T_g$ of −2° C. as calculated by Fox's Law. The polymer formulation, in order of addition, is described below in Table 5 along with the procedure therefor.

TABLE 5

| Ingredients | Amount (grams) | Monomer % per stage | Procedure |
|---|---|---|---|
| Initial Kettle Charge | | | Add deionized water, ammonium water, RHODACAL ™ DS-4, and water dispersable alkyds to reactor, mix them until alkyd is fully dispersed, heat reactor to 80° C. with nitrogen purge. |
| deionized water | 770 | | |
| NH₄OH (38%) | 5 | | |
| RHODACAL ™ DS-4 surfactant | 1 | | |
| Water dispersible alkyd (70%) | 50 | | |
| Monomer Emulsion | | | |
| deionized water | 190 | | Add first initiator solution. Start feed first monomer emulsion over 1 and ½ hours and start 2ⁿᵈ initiator solution over 3 and ½ hours. When 60% of the first monomer emulsion is fed, add 2ⁿᵈ monomer and additives to the remaining monomer and continue feeding monomer to reactor. Rinse monomer feeding pipes. After all monomer emulsion is fed, maintain temperature at 80° C. for one hour. Cool reactor to 65° C. |
| RHODACAL ™ DS-4 surfactant | 40 | | |
| RHODAPEX ™ C0-436 surfactant | 5 | | |
| Rohm & Haas Wet Adhesion Monomer QM1458 (50% active) | 23 | | |
| methacrylic acid monomer | 9 | | |
| methyl methacrylate monomer | 553 | | |
| 2-ethylhexyl acrylate monomer | 410 | | |
| First Initiator Solution | | | |
| deionized water | 20 | | |
| ammonium persulfate | 2.5 | | |
| Second Monomer and Additives | | | |
| 2-ethylhexyl acrylate monomer | 93 | | |
| SILQUEST ™ A-151 | 4.8 | | |
| isooctyl 2-mercaptopropionate CTA | 3 | | |
| deionized water | 23 | | |
| RHODACAL ™ DS-4 | 5 | | |
| Second Initiator Solution | | | |
| deionized water | 40 | | |
| ammonium persulfate | 2.5 | | |
| deionized water (rinse) | 10 | | |
| Chaser Solutions | | | Feed t-butyl hydroperoxide and sodium hydroxymethanesulfinate solution over 30 minutes. Cool to 35° C. and add ammonium solution. |
| t-butyl hydroperoxide | 1.4 | | |
| deionized water | 10 | | |
| sodium hydroxymethanesulfinate | 1 | | |
| deionized water | 15 | | |
| pH Adjustor | | | |
| ammonium hydroxide (38%) | 10 | | |
| deionized water | 10 | | |

Example 6-7

Paint Compositions Containing Two-Stage Polymers

Examples 6-7 describe paint compositions according to the invention, each comprising a two-stage polymer. The paint composition formulations of Examples 1 and 2, in order of addition, are described below in Table 6. The paint composition formulations of Examples 3 and are described in Table 7 below.

TABLE 6

| Ingredients | Example 6 Amount (grams) | Example 7 Amount (grams) |
|---|---|---|
| Grind Composition | | |
| water | 118 | 103 |
| TAMOL 731A dispersant | 15 | 15 |
| Zinc oxide pigment | 23 | 23 |
| TRONOX CR-826 pigment | 292 | 292 |
| Kaolin pigment | 50 | 40 |
| Pigment(s)/colorant(s), if desired | | |
| DREWPLUS L475 defoamer | 0.7 | 0.7 |
| TRITON X-100 surfactant | 20 | 20 |
| SKANE M-8 microbiocide | 1.9 | 1.9 |
| NUOSEPT 95 microbiocide | 0.9 | 0.9 |
| DREWPLUS L475 defoamer | 0.7 | 0.5 |
| Let-Down | | |
| Polymer of Example 1 | 550 | — |
| Polymer of Example 2 | — | 550 |
| Archer RC | 12 | 14 |
| propylene glycol solvent | 20 | 20 |
| ACRYSOL RM-2020 NPR | 25 | 20 |
| ACRYSOL RM-825 | 6 | 6 |
| water | 49 | 64 |
| Formaster A40 defoamer | 1.5 | 2 |

Example 8-9

Paint Compositions Containing Two-Stage Polymers

Examples 8-9 describe paint compositions according to the invention, each comprising a two-stage polymer. The paint composition formulations of Examples 3 and 5, in order of addition, are described below in Table 7.

TABLE 7

| Ingredients | Example 8 Amount (grams) | Example 9 Amount (grams) |
|---|---|---|
| Grind Composition | | |
| water | 85 | 85 |
| TAMOL 731A dispersant | 13 | 13 |
| IGEPAL CO 630 | 5 | 5 |
| Stodex LFK 70 | 4 | 4 |
| Zinc oxide pigment | 23 | 23 |
| TRONOX CR-826 pigment | 287 | 287 |
| Pigment(s)/colorant(s), if desired | | |
| BYK019 defoamer | 1 | 1 |
| SKANE M-8 microbiocide | 1.8 | 1.8 |
| Kathon LX 1.5% NUOSEPT 95 microbiocide | 1.0 | 1.0 |
| Let-Down | | |
| Polymer of Example 3 | 485 | — |
| Polymer of Example 5 | — | 485 |

TABLE 7-continued

| Ingredients | Example 8 Amount (grams) | Example 9 Amount (grams) |
|---|---|---|
| Archer RC | 12 | 14 |
| Eastman EEH Solvent | 7.5 | 7.5 |
| propylene glycol solvent | 7.5 | 7.5 |
| Triton GR-5M surfactant | 2 | 2 |
| AQUAFLOW NHS-300 | 18 | 18 |
| ACRYSOL RM-825 | 3 | 3 |
| water | 100 | 100 |
| BYK019 defoamer | 3 | 3 |

Examples 10-11

Paint Compositions Containing High Molecular Weight Polymers

Comparative Examples 10-11 describe paint compositions each comprising a single, relatively high molecular weight polymer from Rohm and Haas Company. These polymers are recommended for applications for exterior house paints. The paint composition formulations, in order of addition, are described below in Table 8.

TABLE 8

| Ingredients | Comparative Example 10 Amount (grams) | Comparative Example 11 Amount (grams) |
|---|---|---|
| Grind Composition | | |
| water | 133 | 90 |
| TAMOL 731A dispersant | 15 | 15 |
| Zinc oxide pigment | 23 | 23 |
| TRONOX CR-826 pigment | 292 | 292 |
| Kaolin pigment | 50 | — |
| Pigment(s)/colorant(s), if desired | | |
| DREWPLUS L475 defoamer | 0.7 | 0.7 |
| TRITON X-100 surfactant | 20 | 10 |
| SKANE M-8 microbiocide | 1.9 | 1.9 |
| NUOSEPT 95 microbiocide | 0.9 | 1 |
| DREWPLUS L475 defoamer | 0.5 | 0.5 |
| Let-Down | | |
| RHOPLEX MV-23# polymer | 550 | — |
| RHOPLEX VSR-50x polymer | — | 550 |
| TEXANOL coalescent | 14.8 | — |
| OPTIFILM Enhancer400 coalescent | — | 15 |
| propylene glycol solvent | 35 | 35 |
| ACRYSOL RM-2020 NPR | 20 | 20 |
| ACRYSOL RM-825 | 14.6 | 1.7 |
| water | 34 | 30 |
| DREWPLUS L-475 defoamer | 4 | 4 |

Chalk Adhesion Testing

Chalk binding tests are typically performed on chalky substrates. Chalky substrates are commercial alkyd paints that have been naturally weathered to achieve an ASTM chalk ratings of about 5. A suitable test method is described in U.S. Pat. No. 6,268,420

In these cases, chalky substrates are western red cedar panels painted with commercially available alkyd paints and weathered to have ASTM ratings of 5 using the method described in the '420 patent. Various 3-mil thick draw down coatings of paint compositions were applied to these panels and let dry for about 7 days at ambient conditions. After drying, the coated panels were placed in a fog box, simulating rain conditions at 100% humidity, for about 4 hours and were dried in air at ambient conditions for about 1 hour prior to the cross-hatch adhesion test using Scotch™ 600 tape, as detailed in ASTM D3359 Method B. The percentage peeling (area) were tabulated for coatings made from each of the paint compositions of Examples 6-11, as well as Comparative Example A (a paint composition containing a blend of an alkyd resin and a high molecular weight, high glass transition temperature polymer, as described herein, which composition is commercially available from Benjamin Moore, Inc., as Benjamin Moore 0961B). Table 9 below shows those results.

TABLE 9

| Sample | Chalk Adhesion (% peeling) |
|---|---|
| Example 6 | 0% |
| Example 7 | 0% |
| Example 8 | 0% |
| Example 9 | 0% |
| Comparative Example 10 | 50% |
| Comparative Example 11 | 40% |
| Comparative Ex. A | 10% |

The results in Table 9 show that the inventive examples (Examples 6-9) exhibit chalk adhesion properties that are superior than those exhibited by an alkyd resin-containing polymer (Comparative Example A), and even more superior than those exhibited by paint compositions containing high molecular weight polymers (Comparative Examples 10 and 11).

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A latex composition comprising sequentially polymerized polymer particles formed in at least two polymerization stages so as to form a first phase polymer, which results from a first polymerization stage, and a second phase polymer, which results from a second polymerization stage, wherein:
the first phase polymer is made from a first set of constituent monomers, has a number average molecular weight greater than about 100,000 Daltons, has a glass transition temperature from 10° C. to 16° C. and at least 10° C. higher than the glass transition temperature of the second phase polymer, and optionally comprises a first crosslinkable monomer;
the second phase polymer is made from a second set of constituent monomers, has a number average molecular weight between about 7,000 to 80,000 Daltons, has a glass transition temperature below about 5° C., and comprises a second crosslinkable monomer; and
wherein the second phase polymer comprises between about 30% to about 50% of the total weight of the polymer, and wherein the glass transition temperature is calculated using Fox's law.

2. The latex composition of claim 1, wherein the first crosslinkable monomer comprises a dialkoxyalkyl vinyl silane, a trialkoxy vinyl silane, monoalkoxy acrylic silanes, dialkoxy acrylic silanes, trialkoxy acrylic silanes, trialkoxy methacrylic silanes, monoalkoxy epoxy silanes, dialkoxy epoxy silanes, trialkoxy epoxy silanes, diacetone acrylamides, acetoacetoxyethyl methacrylate, or a combination thereof.

3. The latex composition of claim 2, wherein the first crosslinkable monomer comprises diacetone acrylamide and further comprises adipic dihydrazide.

4. The latex composition of claim 1, wherein the first phase polymer comprises the first crosslinkable monomer in the amount of about 0.1% to about 5% by weight of the constituent monomers of the first phase polymer.

5. The latex composition of claim 1, wherein the second phase polymer comprises the second crosslinkable monomer in the amount of about 0.1% to about 5% by weight of the constituent monomers of the second phase polymer.

6. The latex composition of claim 5, wherein the second phase polymer comprises the second crosslinkable monomer in the amount of 0.5% to about 2% by weight of the constituent monomers of the second phase polymer.

7. The latex composition of claim 1, wherein the first crosslinkable monomer comprises one crosslinkable monomer and the second crosslinkable monomer comprises two crosslinkable monomers.

8. The latex composition of claim 7, wherein the first crosslinkable monomer comprises diacetone acrylamide, and wherein the second crosslinkable monomer comprises diacetone acrylamide and an alkoxy silane.

9. The latex composition of claim 1, wherein the glass transition temperature of the second phase polymer is below about 0° C.

10. The latex composition of claim 1, wherein the number average molecular weight of the first phase polymer is from about 100,000 Daltons to about 1,500,000 Daltons.

11. The latex composition of claim 10, wherein the number average molecular weight of the first phase polymer is from about 200,000 to about 1,000,000.

12. The latex composition of claim 1, wherein the constituent monomers of the first phase polymer are substantially acrylic, the constituent monomers of the second phase polymer are substantially acrylic, or both the constituent monomers of the first phase polymer and the second phase polymer are substantially acrylic.

13. A coating composition comprising the latex composition of claim 1.

14. A paint composition comprising the latex composition of claim 1.

15. The paint composition of claim 14, having a volatile organic compound content less than about 50 g/L.

16. A coated substrate comprising a substrate having at least one surface on which a coating of the paint composition of claim 14 is disposed.

17. The coated substrate of claim 16, wherein the substrate comprises wood, a metal, a ceramic, a transparent substrate, a translucent substrate, a polymer, a woven fabric, a non-woven fabric, a building material, a chalky substrate, or a combination thereof.

18. The latex composition of claim 1, wherein the second crosslinkable monomer comprises a dialkoxyalkyl vinyl silane, a trialkoxy vinyl silane, monoalkoxy acrylic silanes, dialkoxy acrylic silanes, trialkoxy acrylic silanes, trialkoxy methacrylic silanes, monoalkoxy epoxy silanes, dialkoxy epoxy silanes, trialkoxy epoxy silanes, diacetone acrylamides, acetoacetoxyethyl methacrylate, or a combination thereof.

19. The latex composition of claim 2, wherein the second crosslinkable monomer comprises diacetone acrylamide and further comprises adipic dihydrazide.

20. A latex composition comprising sequentially polymerized polymer particles formed in at least two polymerization stages so as to form a first phase polymer, which results from a first polymerization stage, and a second phase polymer, which results from a second polymerization stage, wherein:

the first phase polymer is made from a first set of constituent monomers, has a number average molecular weight greater than about 100,000 Daltons, has a glass transition temperature from 10° C. to 16° C. and at least 10° C. than the glass transition temperature of the second phase polymer, and optionally comprises a first crosslinkable monomer;

the second phase polymer is made from a second set of constituent monomers, has a number average molecular weight between about 7,000 and 80,000 Daltons, has a glass transition temperature below about 5° C., and comprises a second crosslinkable monomer; and wherein the second phase polymer comprises between about 30% to 45% of the total weight of the polymer, and wherein the glass transition temperature is calculated using Fox's law.

21. A latex composition comprising sequentially polymerized polymer particles formed in at least two polymerization stages so as to form a first phase polymer, which results from a first polymerization stage, and a second phase polymer, which results from a second polymerization stage, wherein:

the first phase polymer is made from a first set of constituent monomers, has a number average molecular weight greater than about 100,000 Daltons, has a glass transition temperature from 10° C. to 16° C. and at least 10° C. higher than the glass transition temperature of the second phase polymer, and optionally comprises a first crosslinkable monomer;

the second phase polymer is made from a second set of constituent monomers, has a number average molecular weight between about 7,000 and 80,000 Daltons, has a glass transition temperature below about 5° C., and comprises a second crosslinkable monomer comprised of a dialkoxyalkyl vinyl silane, a trialkoxy vinyl silane, monoalkoxy acrylic silanes, dialkoxy acrylic silanes, trialkoxy acrylic silanes, trialkoxy methacrylic silanes, monoalkoxy epoxy silanes, dialkoxy epoxy silanes, trialkoxy epoxy silanes, or a combination thereof; and wherein the second phase polymer comprises between about 30% to about 50% of the total weight of the polymer, and wherein the glass transition temperature is calculated using Fox's law.

* * * * *